United States Patent
Maruyama

(10) Patent No.: US 8,958,102 B2
(45) Date of Patent: Feb. 17, 2015

(54) CONTROL DEVICE, NON-TRANSITORY COMPUTER READABLE MEDIUM, AND CONTROL METHOD

(71) Applicant: Fuji Xerox Co., Ltd., Minato-ku (JP)

(72) Inventor: Satoshi Maruyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/046,581

(22) Filed: Oct. 4, 2013

(65) Prior Publication Data

US 2014/0211245 A1 Jul. 31, 2014

(30) Foreign Application Priority Data

Jan. 25, 2013 (JP) ................................. 2013-012059

(51) Int. Cl.
G06F 3/12 (2006.01)
(52) U.S. Cl.
CPC .................................... G06F 3/1297 (2013.01)
USPC ......... 358/1.15; 358/1.13; 358/1.16; 358/1.1; 713/1
(58) Field of Classification Search
None
See application file for complete search history.

(56) References Cited

U.S. PATENT DOCUMENTS 8,351,066 B2 * 1/2013 Toyamasaki ................. 358/1.15
8,817,278 B2 * 8/2014 Maekawa .................... 358/1.13

FOREIGN PATENT DOCUMENTS

JP 2011-110747 A 6/2011

* cited by examiner

*Primary Examiner* — Paul F Payer
(74) *Attorney, Agent, or Firm* — Sughrue Mion, PLLC

(57) ABSTRACT

A control device includes a storage unit in which a parameter group for setting an operational content of an electronic apparatus and functional information related to a function realized when the parameter group is set are stored in correspondence with each other; a reception unit that receives an operation; an extraction unit that extracts the functional information from the storage unit when a changing operation for changing at least one parameter is received by the reception unit, the functional information corresponding to the parameter changed by the changing operation; a presentation unit that presents the extracted functional information; and a setting unit that reads the parameter group corresponding to the presented functional information from the storage unit and sets the parameter group when the reception unit receives a usage confirmation operation for confirming that the function corresponding to the presented functional information is to be used.

9 Claims, 10 Drawing Sheets

| FUNCTIONAL INFORMATION | ZOOM RATIO (100%) | SHEET SIZE (AUTO) | SHEET TYPE (PLAIN PAPER) | COLOR MODE (BLACK AND WHITE) | DUPLEX/SIMPLEX SELECT (SIMPLEX → SIMPLEX) | N-IN-1 (DISABLED) |
|---|---|---|---|---|---|---|
| ECO-COPY 1 | | | | | SIMPLEX → DUPLEX<br>DUPLEX → DUPLEX | 2 |
| ECO-COPY 2 | | | | | SIMPLEX → DUPLEX<br>DUPLEX → DUPLEX | 4 |
| ECO-COPY 3 | | | | AUTO | SIMPLEX → DUPLEX<br>DUPLEX → DUPLEX | 2 |
| ECO-COPY 4 | | B5 | | | SIMPLEX → DUPLEX<br>DUPLEX → DUPLEX | 2 |
| ECO-COPY 5 | | A4 | RECYCLED PAPER | | SIMPLEX → DUPLEX<br>DUPLEX → DUPLEX | 2 |
| ⋮ | ⋮ | ⋮ | ⋮ | ⋮ | ⋮ | ⋮ |

| FUNCTIONAL INFORMATION | ZOOM RATIO (100%) | SHEET SIZE (AUTO) | SHEET TYPE (PLAIN PAPER) | COLOR MODE (BLACK AND WHITE) | DUPLEX/SIMPLEX SELECT (SIMPLEX → SIMPLEX) | N-IN-1 (DISABLED) |
|---|---|---|---|---|---|---|
| ECO-COPY 1 | | | | | SIMPLEX → DUPLEX<br>DUPLEX → DUPLEX | 2 |
| ECO-COPY 2 | | | | | SIMPLEX → DUPLEX<br>DUPLEX → DUPLEX | 4 |
| ECO-COPY 3 | | B5 | | AUTO | SIMPLEX → DUPLEX<br>DUPLEX → DUPLEX | 2 |
| ECO-COPY 4 | | A4 | RECYCLED PAPER | | SIMPLEX → DUPLEX<br>DUPLEX → DUPLEX | 2 |
| ECO-COPY 5 | | | | | SIMPLEX → DUPLEX<br>DUPLEX → DUPLEX | 2 |
| ... | ... | ... | ... | ... | ... | ... |

T1

CONTROL DEVICE, NON-TRANSITORY COMPUTER READABLE MEDIUM, AND CONTROL METHOD

CROSS-REFERENCE TO RELATED APPLICATIONS

This application is based on and claims priority under 35 USC 119 from Japanese Patent Application No. 2013-012059 filed Jan. 25, 2013.

BACKGROUND

Technical Field

The present invention relates to control devices, non-transitory computer readable media, and control methods.

SUMMARY

According to an aspect of the invention, there is provided a control device including a storage unit, a reception unit, an extraction unit, a presentation unit, and a setting unit. In the storage unit, a parameter group for setting an operational content of an electronic apparatus and functional information related to a function that is realized when the parameter group is set are stored in correspondence with each other. The reception unit receives an operation. The extraction unit extracts the functional information from the storage unit when a changing operation for changing at least one parameter is received by the reception unit, the functional information corresponding to the parameter changed by the changing operation. The presentation unit presents the functional information extracted by the extraction unit. The setting unit reads the parameter group corresponding to the functional information presented by the presentation unit from the storage unit and sets the parameter group when the reception unit receives a usage confirmation operation for confirming that the function corresponding to the functional information presented by the presentation unit is to be used.

BRIEF DESCRIPTION OF THE DRAWINGS

An exemplary embodiment of the present invention will be described in detail based on the following figures, wherein:

FIG. 5 illustrates a parameter table;

DETAILED DESCRIPTION

Configuration According to Exemplary Embodiment

Figure 1:
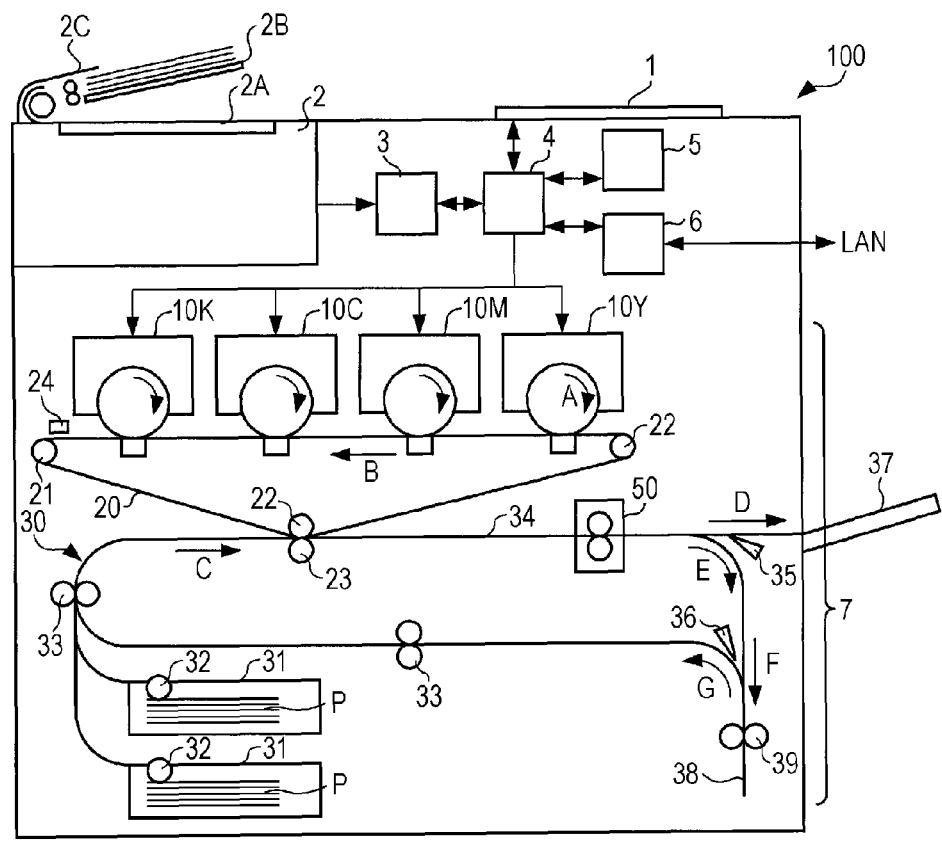
FIG. 1 illustrates a hardware configuration of an image forming apparatus.

FIG. 1 illustrates a hardware configuration of an image forming apparatus 1000.

A controller 4 includes a central processing unit (CPU) as an arithmetic unit, and a read-only memory (ROM) and a random access memory (RAM) as memory units (none of which is shown). The ROM stores firmware that contains a description of a procedure for activating hardware and an operating system (OS). The RAM is used for storing data when the CPU executes an arithmetic process.

A storage unit 5 is, for example, a hard-disk storage unit and stores, for example, the OS or an application program. The controller 4 executes the OS or the application program so as to control each section of the image forming apparatus 1000.

A communication unit 6 is a communication interface (I/F) that is connected to, for example, a local area network (LAN) (not shown) and allows communication between the image forming apparatus 1000 and another apparatus.

A reading unit 2 optically reads a document so as to generate image data. Specifically, the reading unit 2 includes a light source, an optical system, and an imaging element (none of which is shown). The light source radiates light onto a document placed on a platen glass 2A. The light is then reflected by the document, is separated into red (R), green (G), and blue (B) components via the optical system, and finally enters the imaging element. The imaging element converts the incident light into image data and supplies the image data to an image processor 3. The reading unit 2 has a document tray 2B on which documents are placed, and a document transport mechanism 2C that transports the documents placed on the document tray 2B onto the platen glass 2A in a one-by-one manner.

The image processor 3 performs image processing on the image data. Specifically, examples of image processing performed by the image processor 3 on the image data supplied from the reading unit 2 include analog-to-digital conversion, noise removal processing, gamma correction, conversion from R, G, and B components into yellow (Y), magenta (M), cyan (C), and black (K) components, and screen processing. Moreover, the image processor 3 performs similar image processing on image data received from the outside via the communication unit 6. Accordingly, image data that expresses the gradation for each color and each pixel is generated.

Based on the image data supplied from the image processor 3, image forming units 10Y, 10M, 10C, and 10K superpose and form Y, M, C, and K toner images on the surface of a medium P by electrophotography. Since the image forming units 10Y, 10M, 10C, and 10K have the same configuration, they will collectively be referred to as "image forming units 10" if they are not to be distinguished from one another. In that case, the suffixes Y, M, C, and K will similarly be omitted from the components constituting the image forming units 10.

A transport unit 30 transports a recording medium P along a transport path 34. Specifically, medium accommodation sections 31 each accommodate a stack of sheet-shaped recording media P, such as paper. A feed roller 32 is rotationally driven in synchronization with the operation of the image forming units 10 so that the recording media P are fed one-by-one to the transport path 34. A transport roller 33 provided in the transport path 34 is rotationally driven so that each recording medium P is transported along the transport path 34 in a direction indicated by an arrow C. Although FIG. 1 illustrates an example where two medium accommodation sections 31 are provided, a single medium accommodation section 31 or three or more medium accommodation sections 31 may alternatively be provided.

Figure 2:
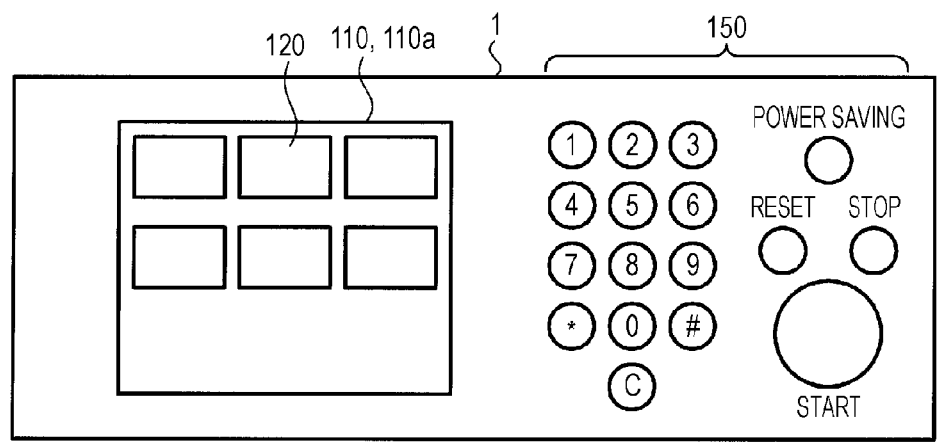
FIG. 2 is an external view of an operating section.

FIG. 2 is an external view of an operating section 1. The operating section 1 includes a display 110 and an operator group 150.

The display 110 is formed of, for example, liquid-crystal elements or organic electro-luminescence (EL) elements. The display 110 has a flat display area 110a whose outer edges form a rectangle. Icons 120 that correspond to various functions of the image forming apparatus 1000 are displayed in the display area 110a. The display 110 has a touch-screen function and detects a user's operation performed on the display area 110a. The controller 4 makes the image forming apparatus 1000 operate in accordance with the detected operation.

The touch-screen may be of any type, such as an electrostatic capacitance type or an electromagnetic induction type. In this exemplary embodiment, the touch-screen is of a type that is operable by a user manually touching the display area 110a (such as an electrostatic capacitance type).

The operator group 150 is a group of pressable buttons including buttons for inputting single-digit decimal numerals and symbols (such as a star button (*) and a pound button (#)), a clear button (for clearing numerical values and symbols), a reset button (for resetting), a stop button (for stopping an operation), a start button (for starting an operation), and a power-saving button (for switching to a power-saving mode).

Figure 3:
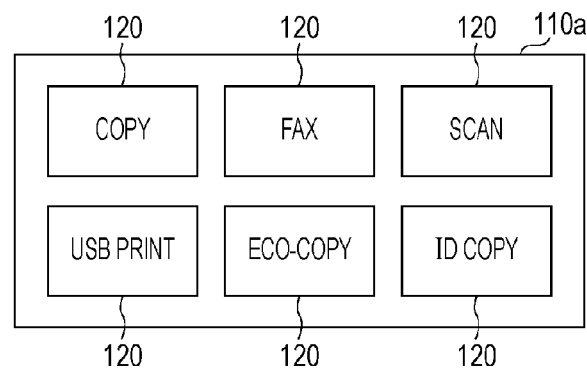
FIG. 3 illustrates an operating screen.

FIG. 3 illustrates an operating screen. The storage unit 5 stores image data of the operating screen to be displayed in the display area 110a. When the power of the image forming apparatus 1000 is turned on, the screen shown in FIG. 3 is displayed. Each icon displays the name of the function that corresponds to the icon. In the following description, a recording medium will be referred to as "sheet".

A "copy" icon corresponds to a function for generating image data by optically reading a document and for forming an image onto a sheet on the basis of the image data (this function will be referred to as "copy function" hereinafter).

A "fax" icon corresponds to a function for transmitting or receiving an image by facsimile (this function will be referred to as "facsimile function" hereinafter).

A "scan" icon corresponds to a function for generating image data by optically reading a document (this function will be referred to as "scan function" hereinafter).

A "USB print" icon corresponds to a function for loading data from a universal serial bus (USB) memory and forming an image on the basis of the data (this function will be referred to as "USB print function" hereinafter).

An "eco-copy" icon corresponds to a function for performing a copy operation while saving sheets by, for example, reducing the size of images (this function will be referred to as "eco-copy function" hereinafter).

An "ID copy" icon corresponds to a function for reading opposite faces of a card, such as an identification card, and forming images read from the opposite faces of the card in a side-by-side manner on one face of a sheet (this function will be referred to as "ID copy function" hereinafter).

When the user touches any of the icons 120, the function corresponding to the touched icon is selected, and a screen used for setting parameters for the operational contents of the image forming apparatus 1000 in the selected function is displayed in the display area 110a.

Figure 4:
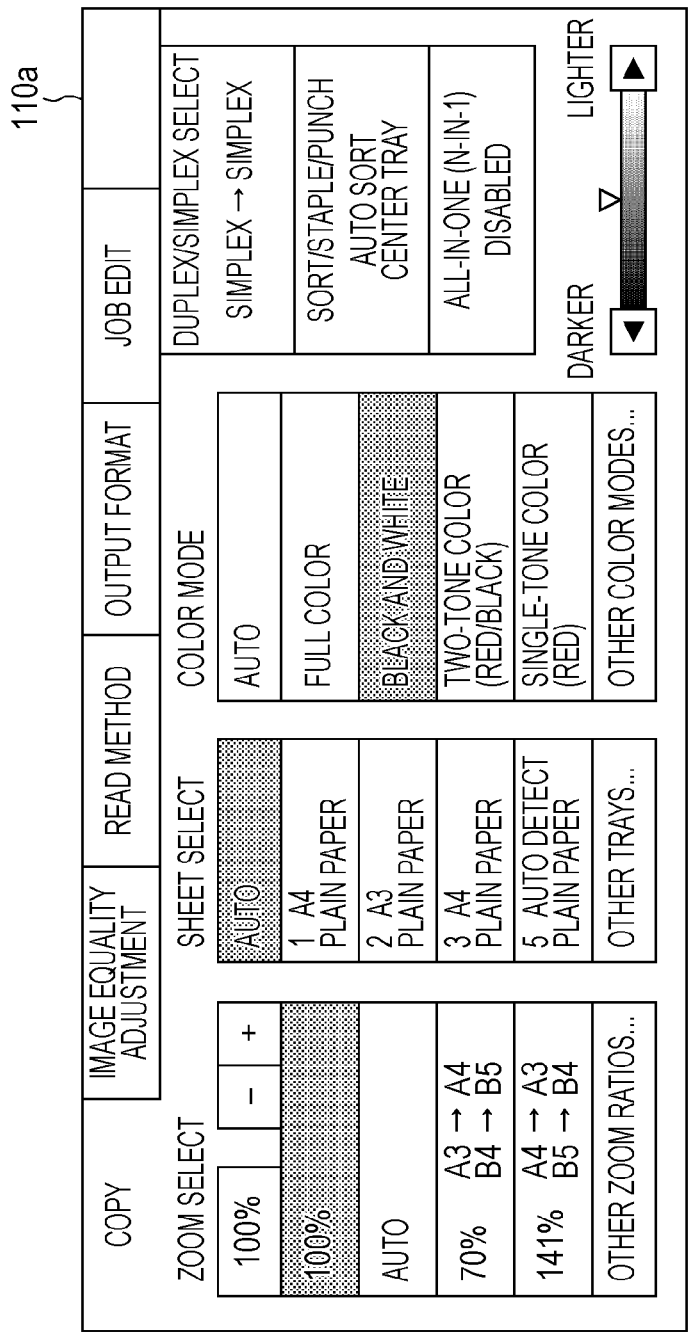
FIG. 4 illustrates a parameter setting screen.

FIG. 4 illustrates the parameter setting screen. Multiple tabs for switching between different screens are displayed at the upper part of the screen. FIG. 4 illustrates a state where a "copy" tab is selected. In this case, a screen used for setting parameters for items, such as "zoom select", "sheet select", "color mode", "duplex/simplex select", and "N-in-1" items, is displayed.

In each of the "zoom select", "sheet select", and "color mode" sections, multiple buttons that correspond to predetermined options are displayed. When the user touches any of the buttons, the parameter corresponding to the touched button is selected, and the color of the button changes.

The "zoom select" item is for setting the zoom ratio of the size of a copied image relative to the size of a document image. In this section, buttons corresponding to options, such as "100%", "auto", "70%", "141%", and "other zoom ratios", are displayed. When the "auto" option is selected, the zoom ratio of an image is adjusted to the size of a sheet set at the "sheet select" section. The "+" and "−" buttons are used for increasing or decreasing the zoom ratio in units of 1%. When "other zoom ratios" option is selected, a screen for setting a zoom ratio other than the aforementioned options is displayed.

The "sheet select" item is for setting the size and the type of a sheet onto which an image is to be formed. In this section, buttons corresponding to options, such as "auto", "A4 plain paper", "A3 plain paper", and "other trays", are displayed. When the "auto" option is selected, a sheet with a size that is suitable for the size of the document is selected. When the "other trays" option is selected, a screen used for selecting a medium accommodation section 31 that accommodates sheets other than the aforementioned options or a manual feed mode (i.e., a mode in which the user manually feeds a sheet through a slot (not shown) provided independently of the medium accommodation sections 31) is displayed.

The "color mode" item is for setting the color or colors to be used for forming an image. In this section, buttons corresponding to options, such as "auto", "full color", and "black and white", are displayed. When the "full color" option is selected, a full-color image forming operation is performed by using the image forming units 10Y, 10M, 10C, and 10K in accordance with the color or colors used in the document. When the "black and white" option is selected, the color or colors used in the document is/are converted into monochrome gray-scale information, and a black-and-white image is formed by using the image forming unit 10K. When the "auto" option is selected, the color or colors used in the document is/are determined, and the "full color" option or the "black and white" option is selected in accordance with the determined color or colors.

The "duplex/simplex select" item is for setting whether to form images on both faces of a sheet or to form an image on one face of the sheet. When the user touches this button, buttons corresponding to options, such as "simplex→simplex", "simplex→duplex", "duplex→duplex", and "duplex→simplex", are displayed (the term before the arrow corresponds to the document and the term after the arrow corresponds to an image-formed face after a copy operation).

The "N-in-1" item is for setting the value of N (N being an integer larger than or equal to 2) when N pages worth of images are to be formed side-by-side onto a single page of a sheet. When the user touches this button, a screen for setting the N value is displayed.

As default values for the above items, "100%" is set for the "zoom select" item, "auto" is set for the "sheet select" item, "black and white" is set for the "color mode" item, "simplex→simplex" is set for the "duplex/simplex select" item, and "disabled" is set for the "N-in-1" item.

FIG. 5 illustrates a parameter table T1. The parameter table T1 is stored in the storage unit 5. In the parameter table T1, functional information and multiple parameters (i.e., a parameter group) are written in correspondence with each other for each function. However, these parameters are different from the default values preliminarily set in the image forming apparatus 1000. When any of these functions is to be executed, a default value is set for any parameter that is left in a blank state. The term "functional information" refers to information that introduces, to the user, a function to be realized when a parameter group stored in correspondence with the function is set in the image forming apparatus 1000. Specifically, text data containing an explanation of the contents of the function is stored as the functional information.

As an example of functions preliminarily set in the image forming apparatus 1000, parameters related to five kinds of eco-copy functions (eco-copy 1 to eco-copy 5) are shown. In each eco-copy function, parameters for the "zoom ratio" item, the "sheet size" item, the "sheet type" item, the "color mode" item, the "duplex/simplex select" item, and the "N-in-1" item are set. A default value for each item is shown in parentheses under the name of that item. With regard to the "duplex/simplex select" item, the "simplex→duplex" option is set when there is an image on one face of the document, and the "duplex→duplex" option is set when there are images on both faces of the document. In other words, images are formed on both faces of the sheet whether the document has an image or images on one face or both faces thereof.

Figure 6:
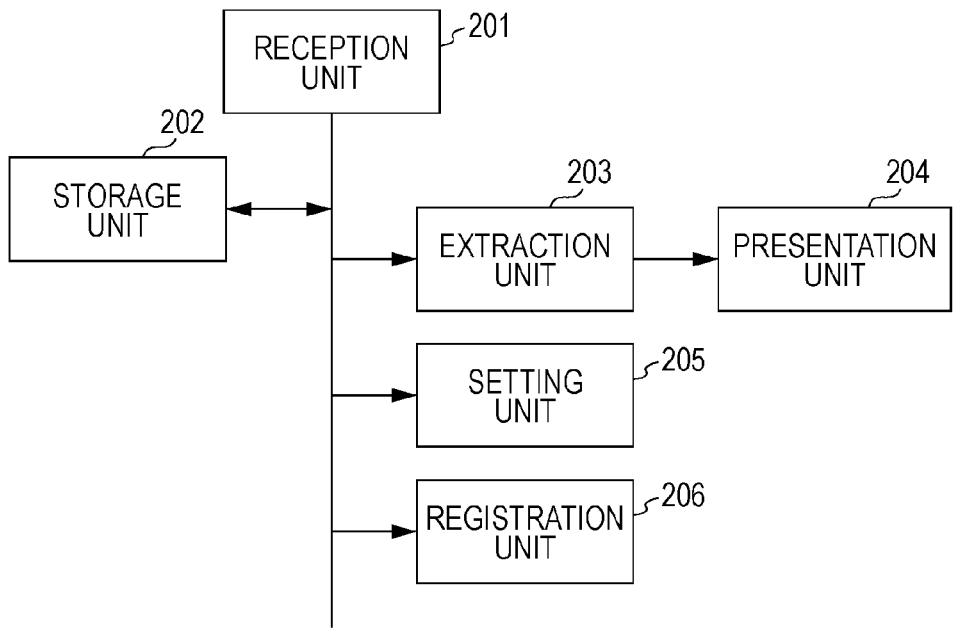
FIG. 6 illustrates a functional configuration of the image forming apparatus.

FIG. 6 illustrates a functional configuration of the image forming apparatus 1000. The controller 4 executes a program stored in the storage unit 5 so as to realize these functions.

A reception unit 201 receives a user's operation. Specifically, the aforementioned operating section 1 corresponds to the reception unit 201.

Next, a storage unit 202 will be described. The storage unit 202 stores a parameter group, for setting the operational contents of the image forming apparatus 1000, in correspondence with functional information related to a function to be realized when the parameter group is set. Specifically, the aforementioned storage unit 5 and the aforementioned parameter table T1 correspond to the storage unit 202.

Next, an extraction unit 203 will be described. When a changing operation for changing at least one parameter is received by the reception unit 201, the extraction unit 203 extracts the functional information corresponding to the parameter changed by the changing operation from the storage unit 202. Specifically, when the user performs an operation (i.e., changing operation) for changing the parameter for any of the items from its default value on the screen shown in FIG. 4, the controller 4 extracts the functional information corresponding to the changed parameter from the parameter table T1. For example, because the default value for the "sheet size" item is "auto", when the user selects "size B5", the parameter for that item is changed from the default value. In this case, eco-copy 4 is extracted as the functional information corresponding to "size B5". As another example, although the default value for the "N-in-1" item is "disabled", when the user selects "N=2", eco-copy 1, 3, 4, and 5 are selected as the functional information corresponding to "N=2".

Next, a presentation unit 204 will be described. The presentation unit 204 presents the functional information extracted by the extraction unit 203. Furthermore, when multiple pieces of functional information are extracted by the extraction unit 203, the presentation unit 204 presents functional information with the minimum number of corresponding parameters. For example, when eco-copy 1, 3, 4, and 5 are extracted, since eco-copy 1 has the minimum number of corresponding parameters, the controller 4 displays the functional information of eco-copy 1 in the display area 110*a*.

Figure 7:
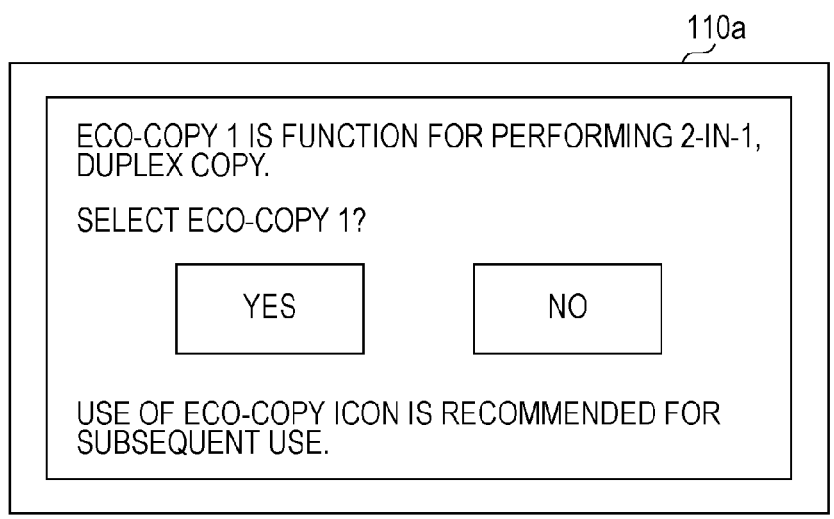
FIG. 7 illustrates displayed functional information.

FIG. 7 illustrates the displayed functional information. When displaying the functional information, the controller 4 makes an inquiry to the user about whether or not to use the function corresponding to the functional information. Furthermore, the controller 4 displays a message for prompting the use of the eco-copy icon.

If there are multiple pieces of functional information with the minimum number of corresponding parameters, the controller 4 displays these pieces of functional information side-by-side in the display area 110*a*.

Next, a setting unit 205 will be described. When the reception unit 201 receives a usage confirmation operation for confirming that the function corresponding to the functional information presented by the presentation unit 204 is to be used, the setting unit 205 reads the parameter group corresponding to the functional information from the storage unit 202 and sets the parameter group. Specifically, when the user touches a "yes" button on the screen in FIG. 7, the controller 4 determines that an operation (i.e., usage confirmation operation) is performed for confirming that eco-copy 1 is to be used, and reads the parameter group ("simplex→duplex", "duplex→duplex", "2-in-1") stored in correspondence with eco-copy 1 from the parameter table T1. Then, the controller 4 sets the read parameter group as parameters for the operational contents of the image forming apparatus 1000.

Figure 8:
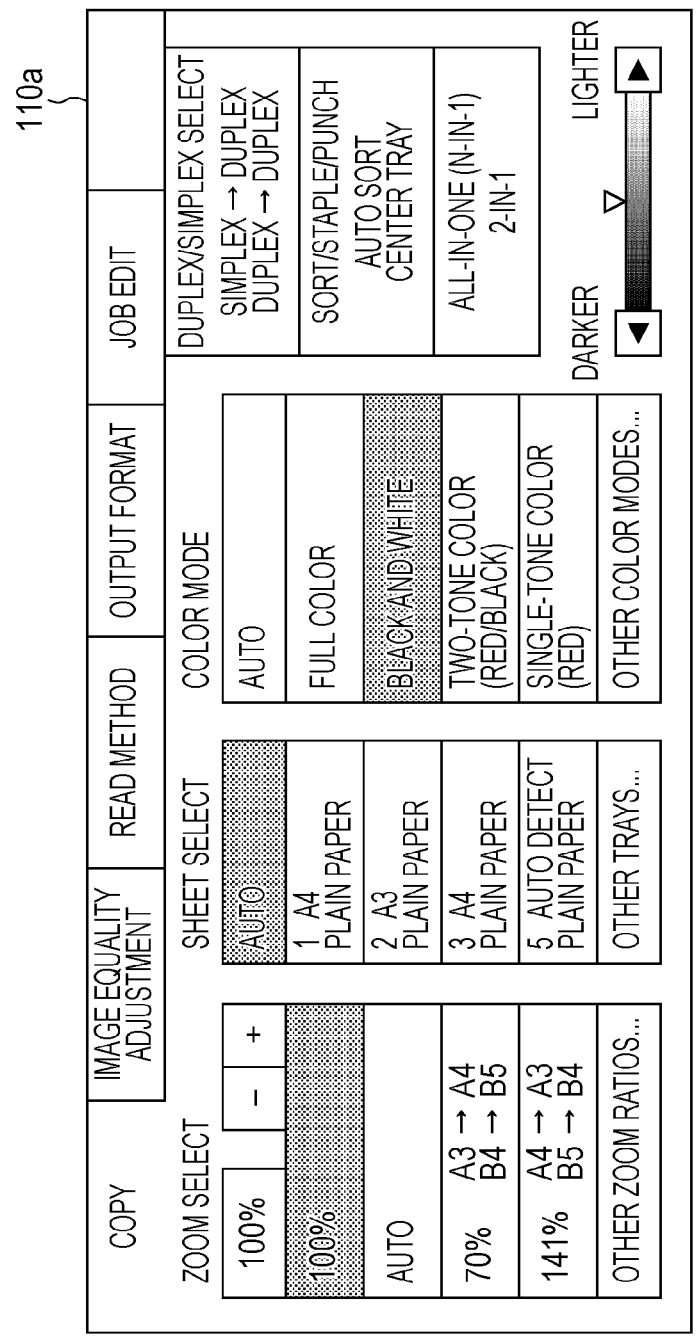
FIG. 8 illustrates a screen that is displayed when a parameter group has been set.

FIG. 8 illustrates a screen that is displayed when the parameter group has been set. When a start button of the operating section 1 is pressed in this state, the image forming apparatus 1000 performs a copy operation in accordance with the set parameters. On the other hand, when the user performs a changing operation on the screen in FIG. 8, the controller 4 functions as the extracting unit so as to extract the functional information corresponding to the changed parameter from the parameter table T1. For example, if the user touches the "N-in-1" button and selects "N=4", the controller 4 extracts eco-copy 2 as functional information corresponding to "N=4", and displays the functional information in a manner similar to that in FIG. 7.

Next, a registration unit 206 will be described. When the reception unit 201 receives a non-usage confirmation operation for confirming that the function corresponding to the functional information presented by the presentation unit 204 is not to be used, the registration unit 206 registers the function corresponding to the parameter changed by the changing operation. Specifically, when the user touches a "no" button on the screen in FIG. 7, the controller 4 makes an inquiry to the user about whether or not to register the function corresponding to the changed parameter.

Figure 9:
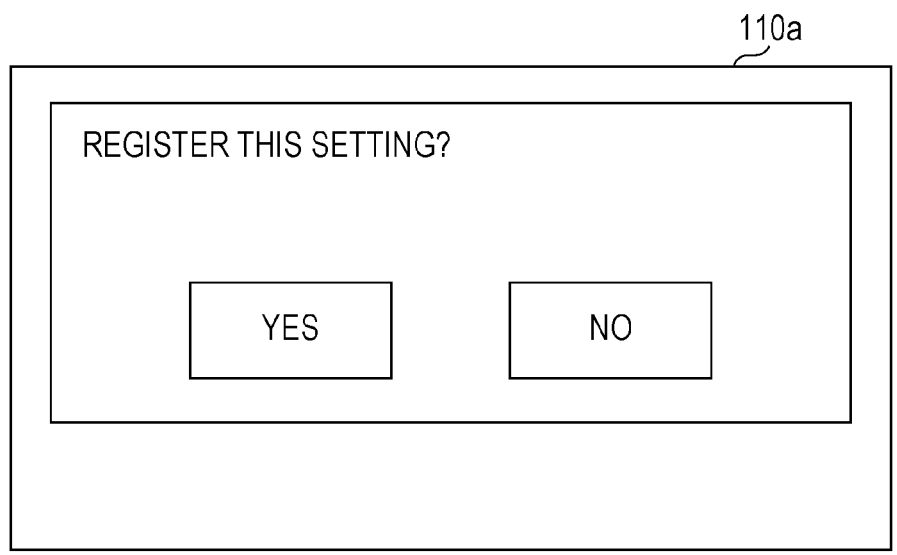
FIG. 9 illustrates a screen used for making an inquiry to a user about whether or not to register a function.

FIG. 9 illustrates a screen used for making the inquiry to the user about whether or not to register the function. If the user touches a "yes" button, the controller 4 asks the user to input a function name.

Figure 10:
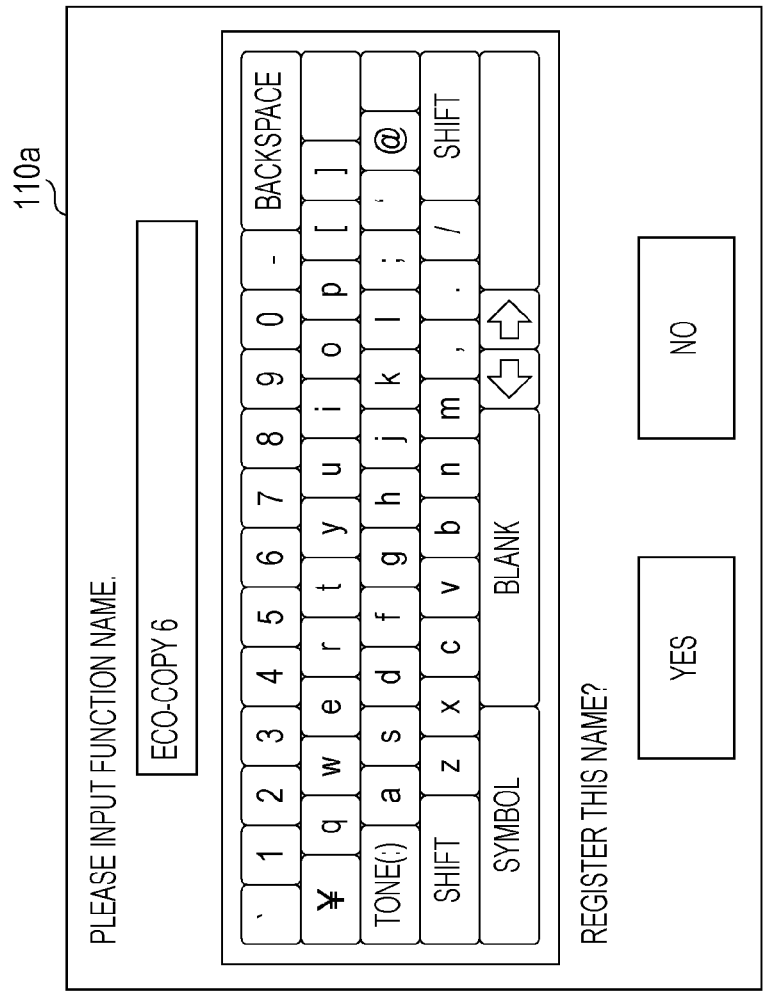
FIG. 10 illustrates a screen used for asking the user to input a function name.

FIG. 10 illustrates a screen used for asking the user to input a function name. On this screen, a software keyboard is displayed. When the user inputs a function name and touches a "yes" button, the controller 4 stores the changed parameter and the function name in correspondence with each other into the storage unit 5. Furthermore, the controller 4 creates an icon that corresponds to the registered function and stores the icon into the storage unit 5. When the user touches the eco-copy icon in FIG. 3 after the registration of the function, the new icon corresponding to the registered function is displayed.

Figure 11:
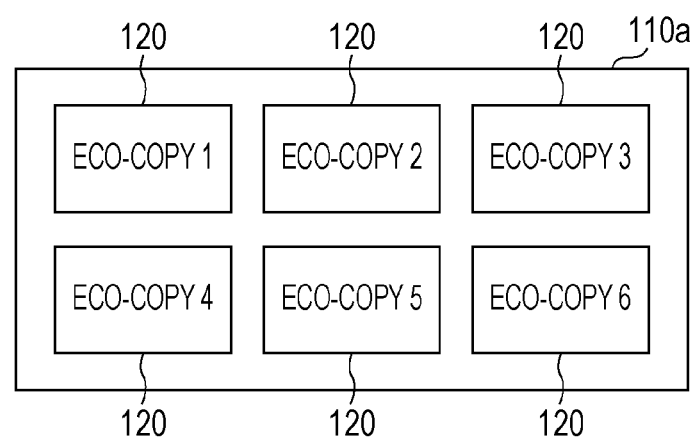
FIG. 11 illustrates icons corresponding to registered functions.

FIG. 11 illustrates icons corresponding to the registered functions. Accordingly, in addition to eco-copy 1 to eco-copy 5, the icon for newly-registered eco-copy 6 is displayed.

Operation According to Exemplary Embodiment

Figure 12:
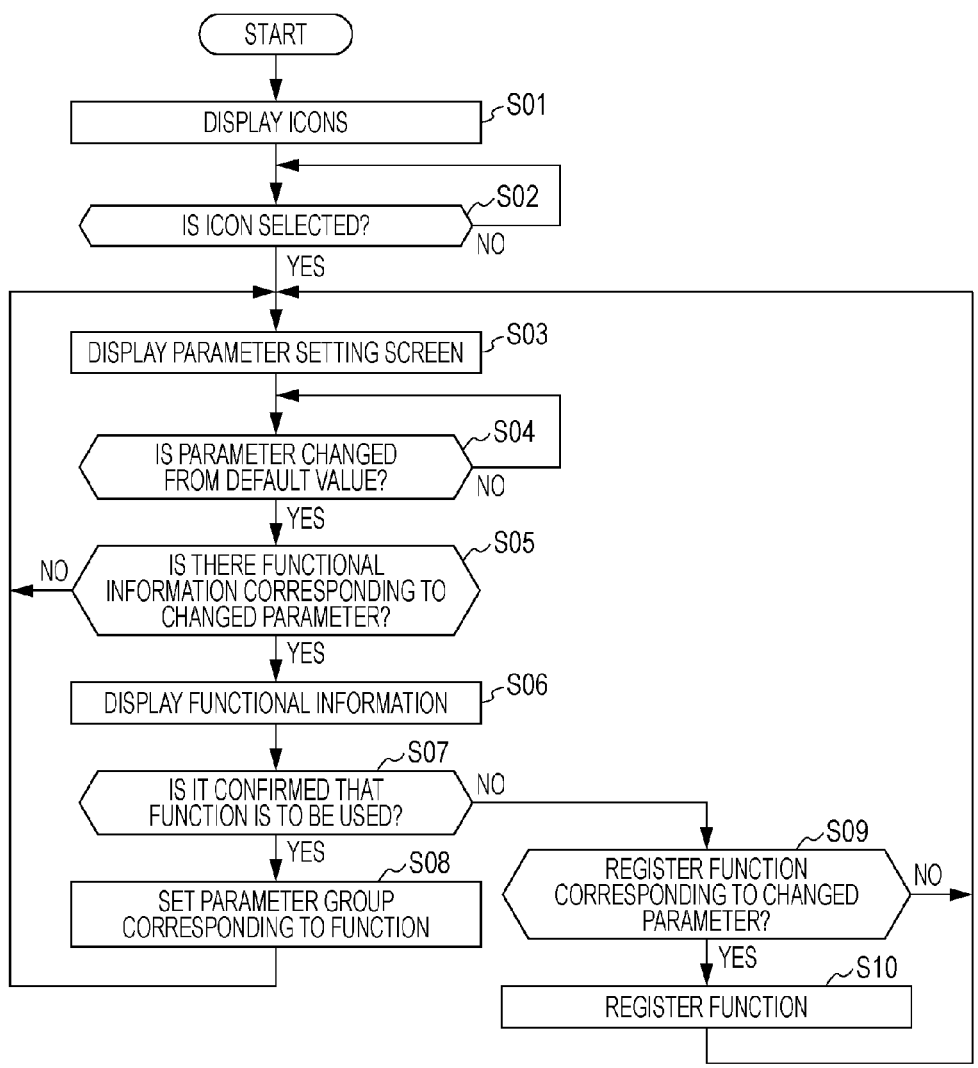
FIG. 12 is a flowchart of the operation of the image forming apparatus.

FIG. 12 is a flowchart of the operation of the image forming apparatus 1000.

In step S01, the controller 4 displays the operating screen shown in FIG. 3 in the display area 110a.

In step SO2, the controller 4 monitors operations performed on the icons displayed in the display area 110a. If any of the icons is selected (YES in step S02), the operation proceeds to step S03. The following relates to an example where the copy icon is selected.

In step S03, the controller 4 displays the parameter setting screen shown in FIG. 4.

If the start button of the operating section 1 is pressed in step S03 and onward, a copy operation commences in accordance with the parameters set at that time.

In step S04, the controller 4 monitors a parameter changing operation. If a changing operation is performed (YES in step S04), the operation proceeds to step S05. In this case, it is assumed that "N=2" is selected for the "N-in-1" item.

In step S05, the controller 4 functions as the extraction unit 203 so as to determine whether or not there is functional information corresponding to the changed parameter. If there is functional information (YES in step S05), the operation proceeds to step S06. If there is no functional information (NO in step S05), the operation returns to step S03. In the case where "N=2" is selected, eco-copy 1, 3, 4, and 5 are extracted as functional information corresponding to "N=2", and the operation proceeds to step S06.

In step S06, the controller 4 functions as the presentation unit 204 so as to display the extracted functional information and to make an inquiry to the user about whether or not to use the aforementioned function, as shown in FIG. 7.

In step S07, the controller 4 functions as the setting unit 205 so as to determine whether or not it is confirmed that the aforementioned function is to be used. If "YES" is selected on the screen in FIG. 7, the controller 4 determines that it has been confirmed that the aforementioned function is to be used (YES in step S07), and the operation proceeds to step S08. On the other hand, if "NO" is selected, the controller 4 determines that it has been confirmed that the aforementioned function is not to be used (NO in step S07), and the operation proceeds to step S09.

In step S08, the controller 4 functions as the setting unit 205 so as to read the parameter group corresponding to the aforementioned function from the parameter table T1 and set the parameter group as parameters for the operational contents of the image forming apparatus 1000. Subsequently, the operation returns to step S03.

In step S09, the controller 4 functions as the registration unit 206 so as to make an inquiry to the user about whether or not to register the function, as shown in FIG. 9. If "YES" is selected on the screen in FIG. 9, the controller 4 determines that registration of the function has been selected ("YES" in step S09), and the operation proceeds to step S10. On the other hand, if "NO" is selected, the controller 4 determines that registration of the function has not been selected (NO in step S09), and the operation returns to step S03.

In step S10, the controller 4 functions as the registration unit 206 so as to display the screen for inputting a function name, as shown in FIG. 10. If "YES" is selected after the function name has been input, the controller 4 creates an icon that corresponds to the function and stores the changed parameter and the icon in correspondence with each other into the storage unit 5. Then, the operation returns to step S03.

The above description relates to the operation according to the exemplary embodiment.

In the exemplary embodiment, when at least one parameter is changed from its default value, the functional information corresponding to the changed parameter is presented. The presented functional information is related to a function in which two or more parameters that are different from the default values are set. In other words, in the exemplary embodiment, when the user changes at least one parameter from its default value, candidates of functions that may possibly be selected by the user are extracted on the basis of the changed parameter. If there is a desired function among the extracted candidates, no more parameters have to be changed, and a parameter group corresponding to the function is set by simply performing a usage confirmation operation. Moreover, because the user recognizes that there is an icon corresponding to the function, the use of the icon may be facilitated.

In the exemplary embodiment, when multiple pieces of functional information are extracted, functional information with the minimum number of corresponding parameters is presented. Supposedly, if all of the extracted pieces of functional information are presented, it make may it difficult for the user to decide which function to select. In contrast, the exemplary embodiment may allow for easier selection of a desired function by the user, as compared with the case where all of the extracted pieces of functional information are presented. Furthermore, it is conceivable that users who are less experienced in using the image forming apparatus tend to struggle more with the setting of the parameters even when a function has a relatively small number of parameters to be changed from the default values. Therefore, the exemplary embodiment is suitable for users who are less experienced in using the image forming apparatus.

Modifications

The above exemplary embodiment may be modified as in the following modifications. Moreover, the exemplary embodiment and any of the modifications may be combined. Furthermore, multiple modifications may be combined.

First Modification

Although the parameter group included in each piece of functional information is a group of parameters that are different from the default values in the above exemplary embodiment, the parameter group included in each piece of functional information may alternatively be default values. Furthermore, although the changing operation is described as being an operation for changing at least one parameter from its default value in the above exemplary embodiment, the parameter prior to the changing operation does not have to be a default value. In other words, a control device according to an embodiment of the present invention includes a storage unit in which a parameter group for setting an operational content and functional information related to a function that is realized when the parameter group is set are stored in correspondence with each other; a reception unit that receives an operation; an extraction unit that extracts the functional information from the storage unit when a changing operation for changing at least one parameter is received by the reception unit, the functional information corresponding to the parameter changed by the changing operation; a presentation unit that presents the functional information extracted by the extraction unit; and a setting unit that reads the parameter group corresponding to the functional information presented by the presentation unit from the storage unit and sets the parameter group when the reception unit receives a usage confirmation operation for confirming that the function corresponding to the functional information presented by the presentation unit is to be used.

Second Modification

When multiple pieces of functional information are extracted by the extraction unit, the presentation unit may display the multiple pieces of functional information in a side-by-side manner.

In this case, the presentation unit may display the parameter group corresponding to the functional information extracted by the extraction unit in correspondence with the functional information, and may display the parameter group such that the parameter changed by the changing operation is displayed differently from other parameters.

For example, the controller 4 displays the parameter table T1 in a display format shown in FIG. 5. When the user touches any of the functional information sections, the controller 4 determines that the function corresponding to the touched functional information has been selected and sets the parameter group corresponding to that functional information in the image forming apparatus 1000. Furthermore, the controller 4 displays the parameter changed by the changing operation performed by the user in red, displays the other parameters in black, and displays a message explaining that the red-highlighted parameter is the parameter changed by the user.

Third Modification

When the number of parameters changed by the changing operation reaches a first threshold value, the presentation unit may present the functional information extracted by the extraction unit.

For example, when the number of changed parameters reaches two, the controller 4 extracts the functional information corresponding to the changed parameters and presents the functional information. In the above exemplary embodiment, even when there is only one parameter that has been changed, if there is functional information corresponding to the changed parameter, the functional information is presented. In this case, it make may it difficult for the user to decide which function to select depending on the number of pieces of functional information presented. In the third modification, the number of pieces of functional information presented is minimized.

Fourth Modification

When the ratio of the number of parameters changed by the changing operation to the number of parameters stored in correspondence with the functional information extracted by the extraction unit reaches a second threshold value, the presentation unit may present this functional information.

For example, it is assumed that the second threshold value is set to 50%. When the user first selects "2-in-1", eco-copy 1, 3, 4, and 5 are extracted, but since the number of parameters corresponding to the functional information is 2, 3, 3, and 4, the ratio of the number of parameters is 50%, 33%, 33%, and 25%, respectively. Therefore, in this example, only the functional information corresponding to eco-copy 1 is presented. Accordingly, in the fourth modification, the number of pieces of functional information presented is minimized.

Fifth Modification

In the above exemplary embodiment according to the present invention, the image forming apparatus has a copy function, a facsimile function, a scan function, and a print function. Alternatively, the exemplary embodiment according to the present invention may be applied to an apparatus having at least one of these functions. As another alternative, the exemplary embodiment according to the present invention may be applied to an apparatus having a function other than the above functions.

In other words, the exemplary embodiment of the present invention may be applied to any kind of an electronic apparatus so long as the apparatus realizes a specific function in a parameter group by setting the parameter group. Furthermore, the exemplary embodiment of the present invention may be applied to a control device that sets parameters in any of the above apparatuses via a communication unit.

In the above exemplary embodiment, functional information is displayed in the display area 110a of the display 110 as an example of the presentation unit. Alternatively, a sound or a voice that expresses the functional information may be output.

Sixth Modification

In the above exemplary embodiment, the controller 4 executes an application program so as to operate the image forming apparatus 1000. Alternatively, this program may be provided in a recorded form in a computer readable recording medium, such as an optical recording medium or a semiconductor memory, and may be loaded from this recording medium and stored into the storage unit 5. As another alternative, this program may be provided via a telecommunication line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
a storage unit in which a parameter group for setting an operational content of an electronic apparatus and functional information related to a function that is realized when the parameter group is set are stored in correspondence with each other;
a reception unit that receives an operation;
an extraction unit that extracts the functional information from the storage unit when a changing operation for changing at least one parameter is received by the reception unit, the functional information corresponding to the parameter changed by the changing operation;
a presentation unit that presents the functional information extracted by the extraction unit; and
a setting unit that reads the parameter group corresponding to the functional information presented by the presentation unit from the storage unit and sets the parameter group when the reception unit receives a usage confirmation operation for confirming that the function corresponding to the functional information presented by the presentation unit is to be used.

2. The control device according to claim 1, wherein when a plurality of pieces of functional information are extracted by the extraction unit, the presentation unit presents functional information with a minimum number of corresponding parameters.

3. The control device according to claim 1, wherein when a plurality of pieces of functional information are extracted by the extraction unit, the presentation unit displays the plurality of pieces of functional information in a side-by-side manner.

4. The control device according to claim 3, wherein the presentation unit displays the parameter group corresponding to the functional information extracted by the extraction unit in correspondence with the functional information and displays the parameter group such that the parameter changed by the changing operation is displayed differently from another parameter.

5. The control device according to claim 1, wherein when the number of parameters changed by the changing operation reaches a first threshold value, the presentation unit presents the functional information extracted by the extraction unit.

6. The control device according to claim 1, wherein when a ratio of the number of parameters changed by the changing operation to the number of parameters stored in correspondence with the functional information extracted by the extraction unit reaches a second threshold value, the presentation unit presents the functional information.

7. The control device according to claim 1, further comprising a registration unit, wherein when the reception unit receives a non-usage confirmation operation for confirming that the function corresponding to the functional information presented by the presentation unit is not to be used, the registration unit registers the function corresponding to the parameter changed by the changing operation.

8. A non-transitory computer readable medium storing a program causing a computer that controls an electronic apparatus to execute a process, the process comprising:

storing a parameter group for setting an operational content of the electronic apparatus and functional information in correspondence with each other, the functional information being related to a function that is realized when the parameter group is set;

receiving an operation;

extracting the stored functional information when a changing operation for changing at least one parameter is received, the functional information corresponding to the parameter changed by the changing operation;

presenting the extracted functional information; and reading the parameter group corresponding to the presented functional information and setting the parameter group when a usage confirmation operation for confirming that the function corresponding to the presented functional information is to be used is received.

9. A control method comprising:

storing a parameter group for setting an operational content and functional information in correspondence with each other, the functional information being related to a function that is realized when the parameter group is set;

receiving an operation;

extracting the stored functional information when a changing operation for changing at least one parameter is received, the functional information corresponding to the parameter changed by the changing operation;

presenting the extracted functional information; and reading the parameter group corresponding to the presented functional information and setting the parameter group when a usage confirmation operation for confirming that the function corresponding to the presented functional information is to be used is received.

* * * * *